(12) United States Patent
Zoltai et al.

(10) Patent No.: US 7,700,145 B1
(45) Date of Patent: Apr. 20, 2010

(54) METHODS OF MAKING A LOW-CARBOHYDRATE DAIRY BEVERAGE AND DAIRY BEVERAGES MADE FROM SUCH METHODS

(75) Inventors: Peter Zoltai, Newburyport, MA (US); John Edwards, Jr., Clyo, GA (US); Margaret Poole, Topsfield, MA (US); David Kreider, Boxford, MA (US); John Laaperi, Abington, MA (US); Richard Kenahan, Jr., Bedford, MA (US)

(73) Assignee: HP Hood LLC, Chelsea, MA (US)

( * ) Notice: Subject to any disclaimer, the term of this patent is extended or adjusted under 35 U.S.C. 154(b) by 1031 days.

(21) Appl. No.: 10/778,326

(22) Filed: Feb. 17, 2004

(51) Int. Cl.
*A23C 9/00* (2006.01)

(52) U.S. Cl. .................. 426/580; 426/72; 426/74; 426/519; 426/522

(58) Field of Classification Search .................. 426/72, 426/73, 74, 519, 520, 521, 522, 580, 583, 426/584, 585, 586, 587, 588
See application file for complete search history.

(56) References Cited

U.S. PATENT DOCUMENTS

| | | |
|---|---|---|
| 1,882,637 A | 10/1932 | Johnson et al. |
| 2,349,227 A | 5/1944 | Thorneloe et al. |
| 2,682,467 A | 6/1954 | Brereton et al. |
| 2,809,113 A | 10/1957 | Stimpson et al. |
| 2,876,104 A | 3/1959 | Bliudzius et al. |
| 3,074,796 A | 1/1963 | Peebles et al. |
| 3,096,177 A | 7/1963 | Ariyama |
| 3,269,842 A | 8/1966 | Mayer et al. |
| 3,873,751 A | 3/1975 | Arndt |
| 3,882,256 A | 5/1975 | De Boer |
| 4,051,269 A | 9/1977 | Strinning |
| 4,085,228 A | 4/1978 | Reinbold et al. |
| 4,110,476 A | 8/1978 | Rhodes |
| 4,165,392 A | 8/1979 | Kawai et al. |
| 4,374,861 A | 2/1983 | Trzecieski |
| 4,401,657 A | 8/1983 | Kashiwabara et al. |
| 4,410,549 A | 10/1983 | Baker |
| 4,497,834 A | 2/1985 | Barta |
| 4,511,590 A | 4/1985 | Caldwell |
| 4,675,200 A | 6/1987 | Serpelloni et al. |
| 4,689,245 A | 8/1987 | Kosikowski et al. |
| 4,837,035 A | 6/1989 | Baker et al. |
| 4,837,036 A | 6/1989 | Baker et al. |
| 4,853,246 A | 8/1989 | Stevens |
| 4,948,599 A | 8/1990 | Sagara et al. |
| 4,956,186 A | 9/1990 | Streiff et al. |
| 4,959,227 A | 9/1990 | Amer |
| 5,064,674 A | 11/1991 | Girsh |
| 5,128,156 A | 7/1992 | McKenna et al. |
| 5,149,559 A | 9/1992 | Alaers et al. |
| 5,198,351 A | 3/1993 | Somkuti et al. |
| 5,334,399 A | 8/1994 | Flynn et al. |
| 5,357,852 A | 10/1994 | Kohler et al. |
| 5,447,740 A | 9/1995 | Brown |
| 5,486,372 A | 1/1996 | Martin et al. |
| 5,492,716 A | 2/1996 | Molochnikov et al. |
| 5,711,982 A | 1/1998 | Takemori et al. |
| 5,776,525 A | 7/1998 | Ide et al. |
| 6,162,472 A | 12/2000 | Griffin et al. |
| 6,384,087 B1 | 5/2002 | Zemel et al. |
| 6,426,110 B1 | 7/2002 | Basa |
| 6,458,409 B1 | 10/2002 | Trouille |
| 6,569,485 B2 | 5/2003 | Hussein |
| 6,635,302 B1 | 10/2003 | Huang et al. |
| 6,667,068 B2 | 12/2003 | Smith |
| 6,685,977 B1 | 2/2004 | Asano et al. |
| 6,716,461 B2 | 4/2004 | Miwa et al. |
| 6,720,018 B2 | 4/2004 | Kawachi et al. |
| 2002/0102346 A1 | 8/2002 | Stark et al. |
| 2002/0119234 A1 | 8/2002 | Finocchiaro |
| 2002/0155198 A1 | 10/2002 | Wang et al. |
| 2003/0031754 A1 | 2/2003 | Lange |
| 2003/0104104 A1 | 6/2003 | Allouche |
| 2004/0040448 A1 | 3/2004 | Dunker et al. |
| 2004/0052860 A1 | 3/2004 | Reid et al. |
| 2004/0208972 A1 | 10/2004 | Calvert, Jr. |

(Continued)

FOREIGN PATENT DOCUMENTS

EP 0 345 226 A2 12/1989

(Continued)

OTHER PUBLICATIONS

Nobel P. Wong, "Fundamentals of Dairy Chemistry," Third Edition, Van Nostrand Reinhold, 1, 3-4 (1988).

(Continued)

*Primary Examiner*—Leslie Wong
(74) *Attorney, Agent, or Firm*—Finnegan, Henderson, Farabow, Garrett & Dunner, LLP (57) ABSTRACT

Methods of making a low-carbohydrate dairy beverage are provided. The method includes the steps of adding specific ingredients in order to obtain a low-carbohydrate dairy beverage having certain nutritional and overall quality characteristics, including one or more of at least the following characteristics: high protein; high calcium; low calories; satisfying flavor, taste, aroma, and/or appearance; and/or extended shelf life. Low-carbohydrate dairy beverages made by such methods are also provided.

52 Claims, 2 Drawing Sheets

U.S. PATENT DOCUMENTS

2004/0208973 A1 10/2004 Calvert, Jr.
2004/0208974 A1 10/2004 Calvert, Jr.

FOREIGN PATENT DOCUMENTS

| | | |
|---|---|---|
| EP | 0 953 289 A2 | 11/1999 |
| GB | 2 066 837 A | 7/1981 |
| GB | 2 147 188 A | 5/1985 |
| JP | 2-303450 A | 12/1990 |
| JP | 6-105651 A | 4/1994 |
| JP | 6-303900 A | 11/1994 |
| JP | 9-252723 A | 9/1997 |
| JP | 10-243776 | 9/1998 |
| JP | 2000-135055 | 5/2000 |
| JP | 2002-051699 A | 2/2002 |
| WO | WO 82/01806 | 6/1982 |
| WO | WO 90/13227 | 11/1990 |
| WO | WO 00/21391 | 4/2000 |
| WO | WO 03/051130 A2 | 6/2003 |

OTHER PUBLICATIONS

E. Renner et al., "Application of Ultrafiltration in the Dairy Industry," Elsevier Applied Science, 112, 132-133 (1991).

"2003 Best Products, New Product Company of the Year: LeCarb," Dairy Foods, 104:11, 24-26 (Nov. 2003).

"No More Blue Milk," Dairy Foods, Ingredient Technology, Buyer's Mart, 48 (Mar. 1999).

Co-pending U.S. Appl. No. 10/753,767, Title: Reduced Fat and Carbohydrate Cultured Dairy Product and Process for Manufacturing Such Cultured Dairy Product, Inventor(s): Frederic R. Calvert, Jr., filed Jan. 8, 2004.

Patent Abstract of Japan 02303450 A, Dec. 17, 1990.

Patent Abstract of Japan 06105651 A, Apr. 19, 1994.

Patent Abstract of Japan 06303900 A, Nov. 1, 1994.

Patent Abstract of Japan 09252723 A, Sep. 30, 1997.

Patent Abstract of Japan 2002051699 A, Feb. 19, 2002.

Nerac.com Retro Search, from FSTA—Food Science & Technology Abstracts, Dec. 1, 2003, 1-66.

Dennis Van Milligen, "Sanitation helps extend shelf life," Plant Operations, 1-5 (Mar. 2001), at http://www.dairyfoods.com/articles/2001/0301/0301plantsf.htm.

David Phillips, "Oneida plant helps meet regional and national demand for long-life products," Plant Review, 1-5, (Dec. 2001), at http://www.dairyfoods.com/articles/2001/1201/1201plant.htm.

"Low-Carb Frozen Dessert (New Product Review).(South West Dairy)(Brief Article)," (Jun. 2002), at http://www.findarticles.com/cf_dls/m3301/6_103/87469101/print.jhtml.

"Ice cream cuts carbs. (Marketwatch).(LeCarb from South West Foods)(Brief Article)," (Dec. 2002), at http://www.findarticles.com/cf_dls/m3289/12_171/95628707/print.jhtml.

"Low-carbohydrate Yogurt.(new from South West Foods)(Brief Article)," (Sep. 2003) at http://www.findarticles.com/cf_dls/m3301/9_104/108267580/print.jhtml.

"Low Carb Luxury Product Spotlight—Shakes and Beverages," (May 23, 2003).

"LeCarb: now milk taps into the Atkins tend," 1-2 (Jun. 20, 2003).

"Ice Cream Cuts Carbs," Prepared Foods 2002-2003 Source Book Market Watch (Dec. 2002), at www.preparedfoods.com/archives/2002/2002_12/1202marketwatch.html.

"Countdown to Success!," Hood Happening, (Oct. 2003).

Anderson Erickson, "AE's Low Carbohydrate Products," at www.aedairy.com/prod_lowcarb.html.

"LeCarb—Products for the Low Carb Lifestyle," at http://www.lecarb.net/.

"Frozen Dessert," at http://www.leecarb.net/products/frozendessert.

"YoCarb," at http://www.lecarb.net/products/yocarb.

"Dairy Drink," at http://www.lecarb.net/products/dairydrink.

"Carb Countdown™ Homogenized," at http://www.hphood.com/products/products.detail.asp?id=477.

"Carb Countdown™ 2% Reduced Fat," at http://www.hphood.com/products/products.detail.asp?id=478.

"Carb Countdown™ Fat Free," at http://www.hphood.com/products/products.detail.asp?id=479.

"Carb Countdown™ 2% Reduced Fat Chocolate," at http://www.hphood.com/products/products.detail.asp?id=480.

Labels for: LeCarb Dairy Drink, Chocolate; LeCarb Dairy Drink, 2% Lowfat; LeCarb Dairy Drink, Homogenized.

English language translation of JP6-303900 and certification page, Jan. 19, 2007.

Fennema, O.R., Food Chemistry, 1985, Marcel Dekker, Inc., New York, $2^{nd}$ Edition, pp. 668-680.

METHODS OF MAKING A LOW-CARBOHYDRATE DAIRY BEVERAGE AND DAIRY BEVERAGES MADE FROM SUCH METHODS

FIELD OF THE INVENTION

Aspects of the present invention relate generally to methods of making a low-carbohydrate dairy beverage and to low-carbohydrate dairy beverages made by the methods. In various embodiments, the low-carbohydrate dairy beverage may have certain nutritional and overall quality characteristics, including one or more of at least the following characteristics: high protein; high calcium; low calories; satisfying flavor, taste, aroma, and/or appearance; and/or extended shelf life.

BACKGROUND

Low-carbohydrate diets are an increasingly popular lifestyle choice. There is a great demand for low-carbohydrate versions of popular food products. One food type for which there has been increased demand for a low-carbohydrate version is dairy products, particularly dairy beverages such as milk. A typical 8 ounce serving of regular milk has approximately 12 grams of carbohydrates, and an 8 ounce serving of chocolate milk has approximately 30 grams of carbohydrates. Milk however includes a large amount of nutrients, such as protein, calcium and vitamins, and is therefore an important component of a balanced diet. Unfortunately, existing low-carbohydrate dairy beverages have not been found to have the desired combination of taste, texture, nutrients, and shelf life. Therefore, there is a need for low-carbohydrate dairy products which have, among other things, a pleasant taste and texture, a high level of nutrients, such as protein, calcium, and vitamins, a low amount in calories, and a reasonable shelf life.

SUMMARY OF THE INVENTION

Some advantages and purposes of the invention will be set forth in part in the description which follows, and may be obvious from the description, or may be learned by practice of the invention. It should be understood that skilled artisans may practice the invention without having one or more features of any of the objects, aspects, or embodiments described herein. In addition, such features are exemplary and at least some of them are set forth in the detailed description which follows.

An exemplary aspect of the invention includes a method for making a dairy product. In this exemplary aspect, the dairy product made by the method is a low-carbohydrate dairy beverage. In a more particular aspect, the dairy product has less than 5 grams of carbohydrates per 8 ounce serving. The method includes selecting ingredients and then adding the ingredients to a tank in the following order to obtain a product: water, calcium caseinate, buttermilk, disodium phosphate, tricalcium phosphate, salt and a stabilizer, a flavor, a sweetener, an emulsifier, a vitamin, skim milk. The method further includes mixing the ingredients as each ingredient is added to the tank, ultrapasteurizing the product, homogenizing the product, and cooling the product.

According to aspects, the method may further include the step of adding cream to the tank before adding skim milk. Alternatively, the method may include the step of adding cream to the tank after adding skim milk. The skim milk may be ultrafiltered skim milk. The method may further include adding whey protein isolate to the tank after adding calcium caseinate. In another aspect, the method may include adding whey protein concentrate to the tank after adding calcium caseinate. The method may further include weighing and measuring the ingredients prior to the adding step. The method may further include determining the percentage of total solids, protein, and fat in the ingredients prior to the adding step. In various aspects, the water may have a temperature of between 40 to 100 degrees F.

In other various aspects, a specific amount of calcium caseinate is added to obtain a specific protein content in the dairy beverage. The tank may include a batch tank and a blend tank. The stabilizer may include one or more of the following: locust bean gum, guar gum, and carrageenan. The flavor may include one or more of the following: vanilla, cocoa, tea, strawberry, mocha, and cappuccino. The sweetener may include one or more of the following: sucralose and acesulfame potassium. The emulsifier may include mono and diglycerides. The vitamin may include one or more of the following: Vitamin A Palmitate and Vitamin D3.

In further aspects, a specific amount of tricalcium phosphate may be added to obtain a specific calcium content in the dairy beverage. In other various aspects, a specific amount of skim milk may be added to obtain a specific protein and calcium content in the dairy beverage. In other aspects, a specific amount of cream may be added to obtain a specific fat content in the dairy beverage. Mixing the ingredients may include recirculating the ingredients between a batch tank and a blend tank. The method may further include measuring the content of solids, protein, fat, and calcium in the product after the mixing step. The method may further include adding additional water to obtain a desired content of solids, protein, fat, and calcium in the dairy beverage. The ultrapasteurizing step may include heating the product to between about 280 to 295 degrees F. for approximately 2 to 12 seconds. The method may further include vacuum cooling the product to between about 150 to 180 degrees F. between the ultrapasteurizing and homogenizing steps. The homogenizing step may include homogenizing the product at two pressure stages of approximately 1500 to 2500 and 500 psi, respectively. In one aspect, the cooling step includes cooling the product to less than 45 degrees F. In another aspect, the cooling step includes cooling the product to less than 70 degrees F.

In various further aspects, the dairy beverage has a carbohydrate content of approximately 3 grams per 8 ounce serving. The dairy beverage may have a protein content of at least 8 grams per 8 ounce serving, and more particularly, approximately 12 grams per 8 ounce serving. The dairy beverage may have a calcium content of at least 300 milligrams per 8 ounce serving, and more particularly, approximately 350 milligrams per 8 ounce serving. The dairy beverage may have a refrigerated shelf life of at least 30 days and an ambient shelf life of at least 90 days, and more particularly, a refrigerated shelf live of approximately 60 days and an ambient shelf life of approximately 180 days.

Another exemplary aspect of the invention includes a method of making a low-carbohydrate dairy beverage having less than 5 grams of carbohydrates per 8 ounce serving. In various aspects, the method includes selecting ingredients and mixing the ingredients together in the following order to obtain an intermediate product: water, calcium caseinate, buttermilk, disodium phosphate, tricalcium phosphate, salt and a stabilizer, a flavor, a sweetener, an emulsifier, a vitamin. The method further includes the step of mixing skim milk and cream in any order to the intermediate product to obtain a final product, ultrapasteurizing the final product, homogenizing the final product, and cooling the final product.

According to aspects, the method may further include one or more of the steps of adding whey protein isolate to the tank after adding calcium caseinate and before adding buttermilk. In other aspects, the method may include the step of adding whey protein concentrate to the tank after adding calcium caseinate and before adding buttermilk. In various aspects, the cream is added to the intermediate product before adding skim milk. The cream may be ultrafiltered skim milk. The cream may be added to the intermediate product after adding skim milk. The sweetener may include a combination of sucralose and acesulfame potassium. The method may further include vacuum cooling the product to between about 150 to 180 degrees F. between the ultrapasteurizing and homogenizing steps.

A further exemplary aspect of the invention is a method of making a low-carbohydrate dairy beverage having less than 5 grams of carbohydrates per 8 ounce serving. In this exemplary aspect the method includes the steps of selecting, weighing, and measuring ingredients, and testing the ingredients for the percentage of total solids, protein, and fat. The method further includes adding water to a batch tank. The water may have a temperature of between 40 to 100 degrees F. The method further includes adding a specific amount of calcium caseinate to a blend tank in order to obtain a specific protein content in the dairy beverage, adding buttermilk to the blend tank, and adding disodium phosphate to the blend tank. The method further includes adding a specific amount of tricalcium phosphate to the blend tank in order to obtain a specific calcium content in the dairy beverage. The method further includes adding salt and stabilizers to the blend tank. The stabilizers may comprise locust bean gum, guar gum, and carrageenan. The method further includes adding a flavor to the blend tank and adding sweeteners to the blend tank. The sweeteners may include sucralose and acesulfame potassium. The method further includes adding emulsifiers to the blend tank, the emulsifiers including mono and diglycerides. The method further includes adding vitamins to the blend tank, the vitamins including one or more of Vitamin A Palmitate and D3. The method further includes adding a specific amount of skim milk to the batch tank in order to obtain a specific protein and calcium content in the dairy beverage, adding a specific amount of cream to the batch tank in order to obtain a specific fat content in the dairy beverage, and mixing the ingredients throughout the above adding steps by recirculating the ingredients between the batch tank and the blend tank. The method may further include measuring the content of solids, protein, fat, and calcium, and adding additional water to obtain a product with a desired content of solids, protein, fat, and calcium. The method further includes heating the product to between 160 to 190 degrees F., ultrapasteurizing the product to between 285 to 295 degrees F. for approximately 2 to 12 seconds on a direct steam injection system or steam infusion system, cooling the product in a vacuum chamber to between 150 to 180 degrees F., homogenizing the product at two pressure stages of approximately 1500 to 2500 and 500 psi, respectively, and cooling the dairy beverage. In one aspect, the cooling step includes cooling the product to less than 45 degrees F. In another aspect, the cooling step includes cooling the product to less than 70 degrees F.

A further exemplary aspect of the invention is a method of making a low-carbohydrate dairy beverage product having less than 5 grams of carbohydrates per 8 ounce serving, including the steps of adding water to a tank, adding calcium caseinate to the tank, adding skim milk to the tank, mixing the contents of the tank to obtain a product, heating the product to at least 150 degrees F., ultrapasteurizing the product, cooling the product, homogenizing the product, and cooling the product.

According to various aspects, the tank may include a first tank in fluid communication with a second tank. The method may further include, between the steps of adding calcium caseinate and adding skim milk, the step of adding whey protein isolate to the tank. The method may further include, after the step of adding the calcium caseinate and whey protein isolate in the tank, adding buttermilk, tricalcium phosphate, salt, a stabilizer, a flavor, a sweetener, an emulsifier, a vitamin, and cream to the tank. In another aspect, the method may further include, between the steps of adding calcium caseinate and adding skim milk, the step of adding whey protein concentrate to the tank.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention. Those embodiments, together with the following description, serve to explain certain principles and provide a further understanding of the invention. In the drawings.

DESCRIPTION OF EXEMPLARY EMBODIMENTS

Reference will now be made in detail to exemplary embodiments illustrated in the accompanying drawings.

Aspects of the present invention relate to methods of making a low-carbohydrate dairy beverage. In one embodiment, the dairy beverage has less than 5 grams of carbohydrates per 8 ounce serving. The method includes a number of steps, including the adding and mixing of a variety of ingredients into one or more tanks, and, in an exemplary embodiment, at least two tanks. Prior to describing an exemplary method of the present invention, we will first describe certain ingredients that may be added in order to make a low-carbohydrate dairy beverage by the methods disclosed herein.

Ingredients

The low-carbohydrate dairy beverages of the present invention may be produced by combining all or some of the following ingredients or raw materials in a predetermined manner: (1) skim milk; (2) caseinate; (3) whey protein; (4) buttermilk; (5) cream; (6) water; (7) sweeteners; (8) calcium; (9) vitamins; (10) stabilizers; (11) flavors; and (12) emulsifiers. Other ingredients may also be added, as desired. The list below is not in any particular order and the various characteristics and contents described for each ingredient are meant to be exemplary only. Specific, exemplary formulations of certain varieties of low-carbohydrate dairy beverages including some or all of these ingredients are described further herein.

(1) Skim Milk. Skim milk provides dairy flavor, solids, protein, carbohydrates, and minimal fat to the dairy beverage. In one embodiment, the solids content of the skim milk is approximately 9%, the protein content is approximately 3%, the carbohydrate content is approximately 5%, and the fat content is approximately 0.1%. The skim milk content of the dairy beverage is typically about 0 to 20%. Fresh pasteurized skim milk is preferred.

Another type of skim milk is ultrafiltered skim milk. Ultrafiltered ("UF") skim milk may be used as an alternative to regular skim milk. Ultrafiltered skim milk is skim milk that has been passed through an ultrafiltration system. A typical ultrafiltration system includes a membrane for removing water, minerals, and sugars such as lactose. Ultrafiltered skim milk provides dairy flavor, high solids, high protein, reduced carbohydrate to solids ratio, reduced lactose, and minimal fat to the dairy beverage. In one embodiment, the solids content of the ultrafiltered skim milk is approximately 15 to 20%, the protein content is approximately 8 to 14%, the carbohydrate content is approximately 3 to 7%, and the fat content is approximately 0.05 to 0.20%. In a more specific embodiment, the solids content of the ultrafiltered skim milk is approximately 18%, the protein content is approximately 11%, the carbohydrate content is approximately 5%, and the fat content is approximately 0.1%. The ultrafiltered skim milk content of the dairy beverage is typically about 0 to 30%. Fresh pasteurized ultrafiltered skim milk is preferred.

(2) Calcium Caseinate. Certain methods of the present invention include the addition of various proteins in order to provide a dairy beverage that is high in protein. Milk proteins have excellent nutritional and functional properties. For example, milk protein is a rich source of essential amino acids. Milk is made up of approximately 3 to 5 percent protein, which can be classified into two basic types: casein proteins and whey proteins.

Casein forms the largest part of the total protein content in fresh milk—approximately 80 percent—so it is an important component of milk. Because casein in an acidic environment is insoluble, it is desirable to convert the casein into a caseinate such as calcium caseinate. Calcium caseinate is typically manufactured from fresh skim milk by precipitation of the casein through acidification. After separation, the fresh casein curd is washed, converted to calcium caseinate, and dried. It can also be instantized and agglomerated. Calcium caseinate has a milky appearance and smooth mouth feel, making it ideal for use in beverages.

Because of the above characteristics, it is desirable to convert casein into caseinates and utilize caseinates as a source of protein in the dairy beverage of the present invention. Therefore, calcium caseinate may be added to the dairy beverage in the method of the present invention. Calcium caseinate provides protein, solids, calcium with minimal fat, and carbohydrates to the dairy beverage. In one embodiment, the solids content of the calcium caseinate is approximately 80 to 99%, the protein content is approximately 80 to 99%, the calcium content is approximately 30 to 50%, the fat content is approximately 0.5 to 2%, and the carbohydrate content is approximately 0.5 to 2%. In a more specific embodiment, the solids content of the calcium caseinate is approximately 95%, the protein content is approximately 90%, the calcium content is approximately 1 to 2%, the fat content is approximately 1%, and the carbohydrate content is approximately 1%. The calcium caseinate content of the dairy beverage is typically about 0 to 10%. Instantized calcium caseinate is preferred for ease of dispersion. Suitable calcium caseinates may be provided by any number of suppliers including, but not limited to, DMV International, Century Foods, Lactalis, Cornerstone, Apollo Foods, Interfoods Limited, Murray Goulburn Cooperative, and New Zealand Milk Products.

(3) Whey Protein. As noted above, whey protein is the other protein (in addition to calcium caseinate) that may be added in the method of the present invention in order to obtain the desired protein levels in the dairy beverage. There are two types of whey protein—whey protein concentrate (WPC) and whey protein isolate (WPI). Whey protein concentrate can be achieved by an ultrafiltration or ion exchange process. During an ultrafiltration process, a membrane may be used to remove lactose and salts from clarified whey, while retaining protein in order to produce a whey protein concentrate which, after drying, constitutes 30 to 80% protein. Suitable whey protein concentrates may be provided by any number of suppliers including, but not limited to, Cornerstone (RT80).

As a refinement, ultrafiltration membranes with a very specific molecular weight filter values can be used to achieve fractionation of the proteins to produce relatively pure whey protein isolate (WPI). In certain beverages, it has been discovered that WPI results in a beverage superior in flavor to one using whey protein concentrate (WPC). Moreover, it has been discovered that WPI has more protein and less fat and carbohydrates than WPC. Therefore, it is preferred that WPI be used in certain embodiments of the present invention, although some embodiments do not include any whey protein at all (see FIG. 2 embodiment).

Whey protein isolate provides protein, solids, and calcium with minimal carbohydrate to the dairy beverage. In one embodiment, the solids content of the whey protein isolate is approximately 80 to 99%, the protein content is approximately 75 to 99%, the fat content is approximately 0.5 to 2%, and the carbohydrate content is approximately 0.5 to 2%. In a more specific embodiment, the solids content of the whey protein isolate is approximately 95%, the protein content is approximately 90%, the fat content is approximately 1%, and the carbohydrate content is approximately 1%. The whey protein isolate content of the dairy beverage is typically about 0 to 10%. Instantized whey protein isolate is preferred for ease of dispersion. Suitable whey protein isolates may be provided by any number of suppliers including, but not limited to, Agri Dairy, American Casein Co., Clofine Dairy Products, Glanbia, Mullins Whey, and Danisco.

(4) Buttermilk. Buttermilk provides sweet cream dairy flavor, high solids, high protein, and minimal fat to the dairy beverage. In one embodiment, the solids content of the buttermilk is approximately 80 to 99%, the protein content is approximately 20 to 45%, the fat content is approximately 2 to 10%, and the carbohydrate content is approximately 35 to 65%. In a more specific embodiment, the solids content of the buttermilk is approximately 97%, the protein content is approximately 34%, the fat content is approximately 6%, and the carbohydrate content is approximately 50%. The buttermilk content of the dairy beverage is typically about 0 to 5%. Buttermilk powder is preferred because it is typically easier to handle than fresh buttermilk. Suitable buttermilks may be provided by any number of suppliers including, but not limited to, Foremost Sweet Cream Buttermilk, J.M. Swank Company, and Main Street Ingredients.

(5) Cream. Cream provides dairy flavor, creamy texture, fat, solids, and minimal carbohydrate to the dairy beverage. In one embodiment, the fat content of the cream is approximately 25 to 55%, the solids content is approximately 30 to 60%, the protein content is approximately 0.5 to 5%, and the carbohydrate content is approximately 1 to 6%. In a more specific embodiment, the fat content of the cream is approximately 40%, the solids content is approximately 45%, the protein content is approximately 2%, and the carbohydrate content is approximately 3%. The cream content of the dairy beverage is typically about 0 to 10%.

(6) Water. High quality water, preferably free from odor, flavor, and particulates, provides moisture for powder dispersion and solubilization to the dairy beverage. Filtered water is preferred. The water content of the dairy beverage is typically about 65 to 95%, depending on the specific type of dairy beverage.

(7) Sweeteners. Preferred sweeteners are artificial sweeteners that add little or no calories or carbohydrates to the dairy beverage. For example, sucralose provides sweetness without carbohydrates or calories to the dairy beverage. The sucralose content of the dairy beverage is typically about 0 to 0.1%. Liquid sucralose is preferred for ease of blending. Suitable sucraloses may be provided by any number of suppliers including, but not limited to, Splenda and McNeil. Acesulfame potassium also provides sweetness without carbohydrates or calories to the dairy beverage. One example of a suitable acesulfame potassium is Nutrinova Sunette Acesulfame Potassium. The acesulfame potassium content of the dairy beverage is typically about 0 to 0.1%. Powdered acesulfame potassium is preferred for ease of blending. It has been discovered that using a combination of sucralose and acesulfame potassium can result in a dairy beverage of superior flavor and sweetness. The level and ratio of sucralose and acesulfame potassium, examples of which are provided below, are important in order to achieve the desired level of sweetness to resemble standard milk products.

(8) Calcium. Calcium is the most abundant mineral in the body and is a major constituent of bone and teeth. Calcium is also involved in several physiological systems such as blood clotting, increasing cell membrane permeability, activating a number of enzymes, and acting as component in neural transmission and muscular contraction. Additionally, calcium deficiency may be a factor in the development of osteoporosis in elderly people. For adults, recent medical studies have indicated that a diet containing the U.S. Recommended Daily Allowance (RDA) of calcium may assist in preventing or mitigating osteoporosis, high blood pressure, and colon cancer. Calcium is also of particular nutritional value in growing children to support bone growth. There is therefore great public interest in the consumption of food products with large quantities of calcium.

Since the human body does not produce calcium, it is totally dependent on an external supply of calcium. Calcium may be obtained from various dietary sources, of which the primary sources are typically dairy product. Dairy sources such as milk have a large amount of naturally occurring calcium. Milk, however, is not generally consumed in sufficient quantities by the general population to obtain the needed levels of calcium. One reason is that milk may be unattractive as a drink for social occasions. Also, a significant number of individuals are lactose intolerant, resulting in gastrointestinal problems if milk is consumed. Further complicating the difficulties of formulating calcium-fortified food products is that foods containing calcium often have their own particular, frequently undesirable taste properties. Additionally, in some food and beverage products, calcium can react with other ingredients and result in undesirable taste properties, especially if stored for an extended time at room temperature.

In the method described below, tricalcium phosphate may be added in order to increase the calcium content of the dairy beverage to a desired target value. Tricalcium phosphate provides a high level of calcium to the dairy beverage made by the method of the present invention. Tricalcium phosphate is desirable because it keeps the calcium in an inert suspension, with the assistance of stabilizers that may also used, thereby having less of an effect on product flavor and stability.

The tricalcium phosphate content of the dairy beverage is typically about 0 to 0.5%. Suitable tricalcium phosphates may be provided by any number of suppliers including, but not limited to, Astaris/Univar, Wedor Corporation, and Westco Chemicals.

(9) Vitamins. Vitamin A Palmitate provides a nutrient supplement to the dairy beverage. The Vitamin A Palmitate content of the dairy beverage is typically about 0 to 0.5%. Some flavor products, such as the full fat dairy beverage described herein, do not use Vitamin A Palmitate. Vitamin D3 also provides a nutrient supplement to the dairy beverage. The Vitamin D3 content of the dairy beverage is typically about 0 to 0.5%. Suitable vitamins may be provided by any number of suppliers including, but not limited to, Degusssa and Danisco. Other vitamins may be added to achieve desired nutrient supplement.

(10) Stabilizers. There are several stabilizers that may be used in the method of making a dairy beverage according to embodiments of the present invention. The following are exemplary stabilizers and any one or combination of the stabilizers may be suitable for a particular dairy beverage. Disodium phosphate is an emulsifying salt stabilizer that provides high temperature process stability to the dairy beverage by ensuring that proteins do not foul the processing equipment during the manufacturing method. The disodium phosphate content of the dairy beverage is typically about 0 to 0.5%. Suitable disodium phosphates may be provided by any number of suppliers including, but not limited to, LidoChem, Westco Chemicals, and J.M. Swank Company. Carrageenan is a hydrocolloid stabilizer that provides body, texture, mouthfeel, and sedimentation stability to the dairy beverage. Mouthfeel is a function of viscosity, thickness, and the melting characteristics of a food item. The carrageenan content of the dairy beverage is typically about 0 to 0.05%. Suitable carrageenans may be provided by any number of suppliers including, but not limited to, FMC Technologies (CM 514, CM 611 (SeaKem), and CM 615), TIC Gums Inc., and Adept Solutions. Locust bean gum is a hydrocolloid stabilizer that provides body, texture, mouthfeel, and sedimentation stability to the dairy beverage. The locust bean gum content of the dairy beverage is typically about 0 to 0.5%. Guar gum is a hydrocolloid stabilizer that provides body, texture, mouthfeel, and sedimentation stability to the dairy beverage. The guar gum content of the dairy beverage is typically about 0 to 0.5%. Suitable stabilizers may be provided by any number of suppliers including, but not limited to, Continental Custom Ingredients (CCI-6002 and CCI EB 6950-600) and Crest Foods.

(11) Flavors. There are several flavors that may be used in the method of making a dairy beverage according to embodiments of the present invention. The following are exemplary flavors and any one or combination of the flavors may be suitable for a particular dairy beverage. Addition of a Natural Flavor helps to maintain the delicate flavor of the ultrapasteurized dairy beverage. The Natural Flavor content of the dairy beverage is typically about 0 to 0.5%. Concentrated liquid Natural Flavor is preferred because it provides the most significant flavor impact without diluting the solids of the dairy beverage. Suitable flavors may be provided by any number of suppliers including, but not limited to, Target (Masking Flavor 3468), OSF Flavors, and Firmenich.

Salt accentuates the flavor of the dairy beverage. The salt content of the dairy beverage is typically about 0 to 0.5%. Granulated salt is preferred because it is easily blended. Suitable salts may be provided by any number of suppliers including, but not limited to, Cargill and Morton.

Cocoa provides rich chocolate flavor to the dairy beverage. The cocoa content of a chocolate flavored dairy beverage is typically about 0.2 to 2.0%. Cocoa powder is preferred because it is easily blended. Suitable cocoas may be provided by any number of suppliers including, but not limited to, Edgar A. Weber & Co. (50-03-0068, 87-59-C, 97-59-C), Cargill (Cerkens Russett), Bensdorp Royal Dutch, ADM, and Dairy House.

Vanilla extract provides the sweet vanilla flavor of the dairy beverage. The vanilla content of a vanilla flavored dairy beverage is typically about 0.1 to 2.0%. Concentrated liquid vanilla extract is preferred because it is easily blended. Suitable vanilla extracts may be provided by any number of suppliers including, but not limited to, Virginia Dare (VB04, VI45), Van Labs, OSF Flavors, and David Michaels.

Strawberry flavor provides the sweet strawberry flavor of the particular ultrapasteurized dairy beverage. The strawberry flavor content of a strawberry flavored dairy beverage according to the present invention is about 0.1 to 2.0%. Concentrated liquid strawberry flavor extract is preferred because it is easily blended.

Coffee flavor provides the coffee flavor of a dairy beverage. The coffee flavor content is about 0.1 to 2.0%. Concentrated liquid coffee flavor extract is preferred because it is easily blended. Suitable coffee flavor may be provided by any number of suitable suppliers including, but not limited to, Autocrat (755, 803). There are a number of other flavors, such as chai tea and cinnamon, that may also be used, as desired.

(12) Emulsifiers. Mono and diglycerides provide stability against phase separation of the dairy beverage. The mono and diglycerides content of the dairy beverage is typically about 0 to 0.5%. Suitable emulsifiers may be provided by any number of suppliers including, but not limited to, Lloyds (Emmol), Danisco Cultor USA (Grinsted Mono-Di E471).

Methods

Aspects of the present invention include methods of making a low-carbohydrate beverage using certain of the ingredients discussed above. The method comprises a particular combination of steps in order to produce a desirable low-carbohydrate beverage. In a preferred embodiment, the dairy beverage will have a carbohydrate content of less than 5 grams per 8 ounce serving, more specifically about 3 grams per 8 ounce serving, and even less carbohydrate content if possible and still maintain an overall quality beverage in terms of, for example, nutritional content and flavor. Exemplary method steps are described below in one exemplary order. The order of steps may vary depending on the specific type of dairy beverage that is being produced. A variation in the order of steps may affect certain characteristics of the dairy beverage, such as taste, aroma, texture, and/or stability. One exemplary method will be described below, and is shown in a flow chart as FIG. 1. Various other methods will also be described. These other methods may vary in order to produce a different type of dairy beverage.

First, the raw materials (referred to as "ingredients") are selected, weighed and measured. The specific ingredients that will be used depend on the type of dairy beverage that is being produced. Examples of different types of dairy products according to the present invention that will have slightly different ingredients (and relative amounts of each ingredient) are a fat free dairy beverage, low fat (such as 1%) dairy beverage, a reduced fat (such as 2% fat) dairy beverage, a whole, or full fat, dairy beverage, a chocolate flavored dairy beverage (including reduced fat and low fat), a mocha flavored dairy beverage, a vanilla flavored dairy beverage, a coffee flavored dairy beverage (such as cappuccino), a chai tea flavored dairy beverage, and a strawberry flavored dairy beverage. The type of ingredients, and the characteristics of the ingredients, may vary depending on the type of dairy beverage. For example, a chocolate flavored dairy beverage will have different amounts of certain flavors and sweeteners than a non-chocolate dairy beverage.

After the appropriate ingredients are measured, the specific ingredients are tested for various characteristics, such as percentage of total solids, percentage of protein, and percentage of fat. These characteristics are tested in order to confirm the amount of each characteristic in the ingredient and to be able to determine the characteristics of the produced dairy beverage. Also, various other tests are performed in order to ensure that the ingredients are safe and suitable for use in the dairy beverage.

Figure 1:
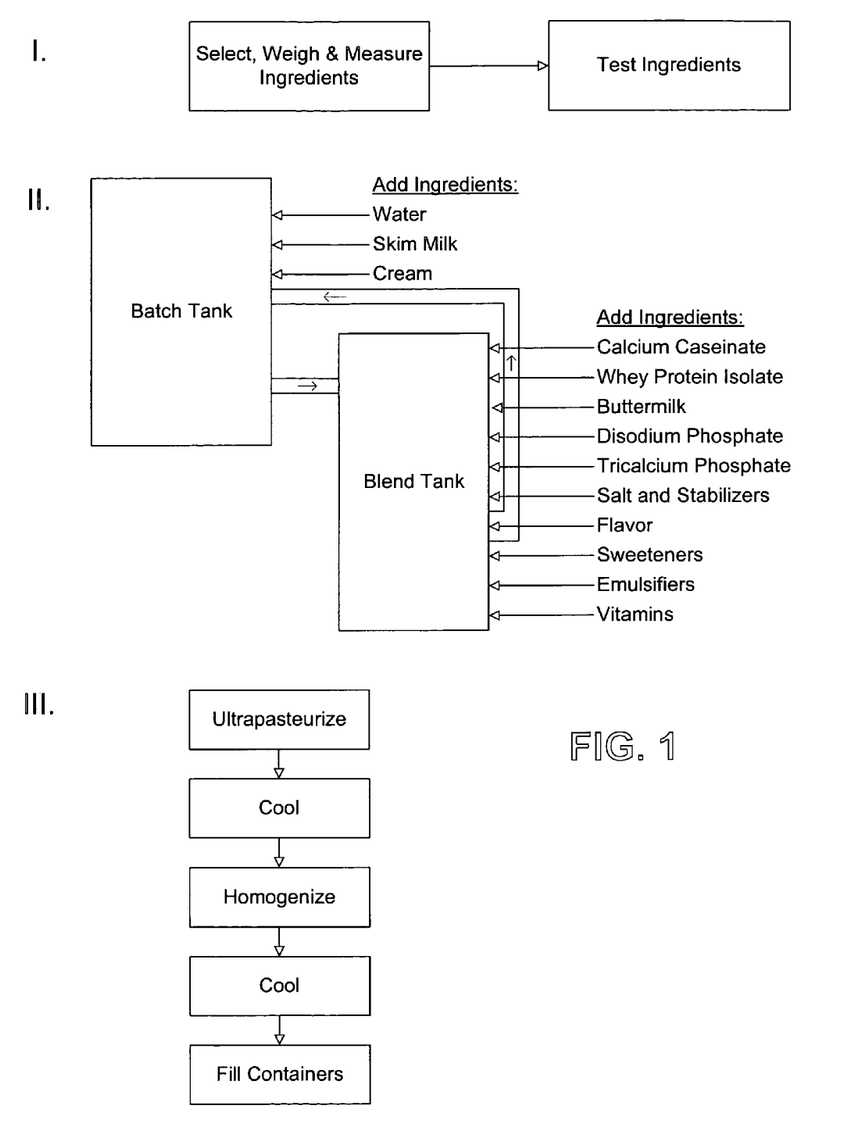
FIG. 1 is a flow chart illustrating a method of making a low-carbohydrate beverage according to an exemplary embodiment of the present invention.

After the ingredients have been tested, they will be mixed together in a predetermined order in certain dairy processing equipment. The equipment for mixing the ingredients may include an agitating batch tank and a high speed agitation blend tank, though other suitable equipment for mixing the ingredients may be used. A schematic of the batch tank and blend tank is shown in FIG. 1. In a preferred embodiment, the batch tank is larger than the blend tank, although the relationship of the sizes may vary. In an exemplary embodiment, the batch tank has a capacity of from about 500 to 15,000 gallons, and the blend tank has a capacity of from about 50 to 200 gallons. In a more specific embodiment, the batch tank generally has a capacity of from about 1,000 to 5,000 gallons, and the blend tank has a capacity of from about 50 to 150 gallons. These sizes are by way of example only and are not meant to limit the invention in any manner.

Each of the tanks includes an internal agitation system to mix the ingredients that will be placed in them. The agitating batch tank may include any suitable mixing system. In one example, the agitating batch tank includes a paddle agitation system. The high speed agitation blend tank will typically include a more intense agitation system than the batch tank. In one embodiment, the blend tank includes a high speed mixer at the bottom of the tank.

Preferably, the dairy processing equipment includes a recirculating system that allows flow of the liquid between the two tanks to facilitate mixing of the ingredients. The recirculating system can be any suitable type. In the example shown in FIG. 1, the recirculating system consists of at least two pipes between the batch tank and blend tank, and pumps in order to cause the liquid to flow between the tanks. In the example shown in FIG. 1, a first pipe allows the liquid to flow from a bottom portion of the batch tank into an upper portion of the blend tank. A second pipe permits the flow of the liquid from a lower portion of the blend tank back into an upper portion of the batch tank. A pump is used in each of the pipes to facilitate the recirculation of the liquid between the tanks through the pipes described above.

This recirculation of ingredients preferably occurs throughout the entire mixing process to mix the ingredients thoroughly.

The ingredients are added together in a predetermined order depending on the type of dairy beverage that is desired and the desired characteristics of the final dairy beverage. As discussed above, the order of the steps can be varied, typically resulting in a dairy beverage with altered characteristics such as taste, aroma, texture, and/or stability.

In one exemplary embodiment, a first step in the addition and mixing of ingredients includes adding a predetermined amount of water to the batch tank. The amount of water is typically predetermined based on the size of the particular production run. The water can be at any suitable temperature. In general, the water should be between about 40 to 100 degrees F. In a more specific embodiment, the water is at room temperature, for example, approximately 80 degrees F. The use of filtered water is generally preferred, but not necessary. In at least some embodiments, a limited amount of the water is held back to be added as the last step of the mixing processes. This will be discussed in further detail below.

In certain embodiments, skim milk is next added to the batch tank. In other embodiments, including the preferred embodiment, the skim milk is added at a later stage, either between the step of adding vitamins to the blend tank and adding cream to the batch tank, or after the step of adding cream to the batch tank. Because the step of adding skim milk is preferably added at a later stage, this step will be described in greater detail at the appropriate step below. However, it is important to understand that the order of steps may vary depending on whether regular skim milk or ultrafiltered (UF) skim milk is used. Either type of skim milk (regular or UF) may be used for any type of dairy beverage, although the use of UF skim milk is generally preferred. We will set forth examples using both types of skim milk, and discuss the differences between a method using regular skim milk and a method using UF skim milk.

Some of the differences in method are a result of the differences between regular skim milk and UF skim milk. A supply or batch of regular skim milk will generally have similar characteristics as any other batch of regular skim milk. There is little variation in the components of regular skim milk—it is generally quite uniform. In contrast, the characteristics of UF skim milk can vary greatly, depending on, among other things, the types of membranes and the processes used to filter the skim milk. However, the use of UF skim milk has many advantages over regular skim milk. By ultrafiltration, many of the undesirable carbohydrates may be removed from the skim milk while leaving large amounts of proteins in the UF skim milk. The decision on whether to use ultrafiltered skim milk may also depend on the specific equipment that is available at the production facility. Therefore, although it is generally preferable to use UF skim milk in certain applications, regular skim milk is best suited for some other applications.

We will first describe an embodiment in which ultrafiltered skim milk is used. One example of a type of dairy beverage that is particularly suitable is a fat free or reduced fat dairy beverage. In an embodiment in which ultrafiltered skim milk will be used, various characteristics of the ultrafiltered skim milk, such as protein and total solids, have already been measured. For each type of dairy beverage, there is typically a target value for certain nutrients, constituents, or other properties per serving size, for example total protein, total solids, total fat, total carbohydrates, and/or total calcium per 8 ounce serving. The amounts of ingredients that need to be added together may be varied for each type of product in order to obtain these target values. For example, in one exemplary embodiment of making a reduced fat dairy beverage, the predetermined target values are at least 12 grams of protein per 8 ounce serving, 8% total solids, at most 3 carbohydrates per 8 ounce serving, and at least 350 grams calcium per 8 ounce serving.

After the step of adding water, the next step is the addition of calcium caseinate. In at least some embodiments, calcium caseinate is added relatively early in the order of adding ingredients, such as after the step of adding water, because it is one of the ingredients that is most difficult to get dispersed in the mixture. Calcium caseinate is one of the main sources of protein in the dairy beverage. By adding calcium caseinate to the liquid, the amount of protein in the dairy beverage may be adjusted. A calculation can be performed to determine the amount of calcium caseinate that should be added in order to obtain a specific target value for protein in the final product. For example, if it is desired that the final dairy product have approximately 12 grams of protein per 8 ounce serving, a calculation can be made to determine the total amount of calcium caseinate that is needed in order to obtain that target value of protein in the final dairy beverage. This step of calculating the amount of an ingredient in order to obtain a target value of a characteristic such as protein, solids, fat, carbohydrates, and/or calcium is referred to as "standardization" of the dairy beverage to the particular characteristic. This standardization step is particularly desirable in methods using UF skim milk because the components of the UF skim milk can vary to such a high degree.

The standardization of the dairy beverage to a protein target value involves, for example, a calculation of the amount of calcium caseinate that should be added in order to obtain the desired target value. This calculation involves a number of equations that can be entered into an appropriate computer spreadsheet. Also, values representing the measured value of various characteristics of the raw materials, such as the percentage of protein and total solids in the skim milk, may be entered into the spreadsheet. Using these values, as well as others, the desired amount of calcium caseinate may be calculated. A basic example of some of the calculations for a reduced fat dairy beverage will be described. In one example of a reduced fat dairy beverage, the target value for protein is approximately 12 grams per 8 ounce serving. This value can be converted to a protein target value percentage for the dairy beverage, based on a number of characteristics, such as density of the final product. In one example, the percentage target value is approximately 5%. Using this protein target value of 5%, the amount of protein from the other protein sources can then be calculated using the various formulas and the measurements of the characteristics of the raw materials. The amount of calcium caseinate that needs to be added to obtain the protein target value can then be calculated based on the difference between the target value and the amount of protein provided by the other sources. Various iterations are typically required, as the amount of the other ingredients are simultaneously being adjusted in order to obtain the target values for other characteristics such as fat, carbohydrates, and calcium.

Figure 2:
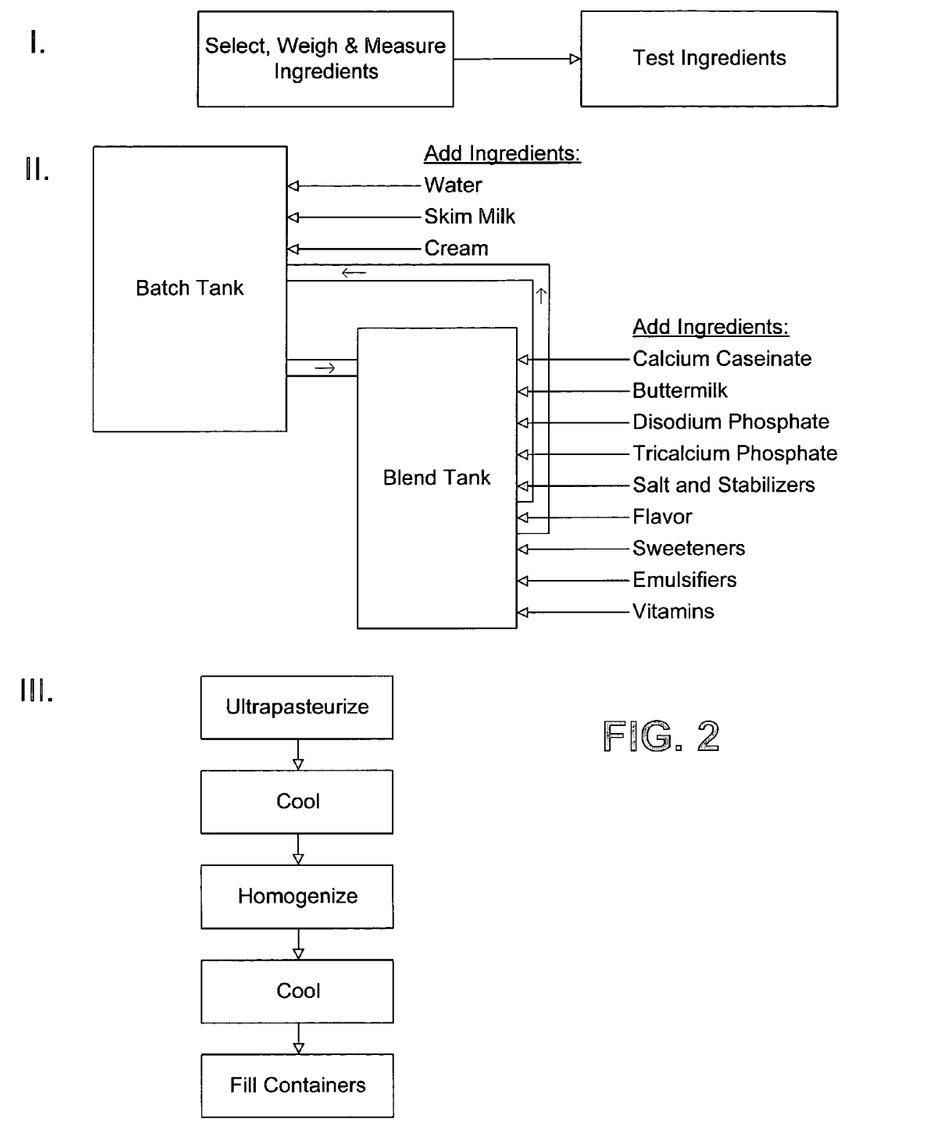
FIG. 2 is a flow chart illustrating a method of making a low-carbohydrate beverage according to another exemplary embodiment of the present invention.

The next step in certain embodiments, after the addition of calcium caseinate, is the addition of whey protein isolate to the blend tank. In certain other embodiments, whey protein concentrate is added instead of whey protein isolate. In other embodiments, such as at least one method for a fat free dairy beverage, no whey protein is added at all. FIG. 2 is a flowchart for an exemplary method in which no whey protein is added. Generally however, the addition of whey protein isolate is preferred, as shown in FIG. 1 and described above.

Next, buttermilk, disodium phosphate, and tricalcium phosphate are sequentially added to the blend tank. Before adding the tricalcium phosphate, the amount of tricalcium phosphate that is needed in order to obtain a specific calcium content in the final dairy product is calculated. The other sources of calcium are the UF skim milk (or regular skim milk), calcium caseinate, whey protein isolate (WPI), buttermilk, and cream. Because the amounts of UF skim milk (or regular skim milk), calcium caseinate, WPI, buttermilk and cream to be added are known, it is possible to calculate (using a spreadsheet or other calculation tool) the amount of tricalcium phosphate necessary in order to obtain the desired calcium level in the final product. For example, if it is desired that the final dairy product have approximately 350 grams of calcium per 8 ounce serving, various equations may be used to calculate the total amount of tricalcium phosphate that is needed in order to obtain that target value of calcium in the finished product. This is referred to as the "standardization" of the dairy beverage to the target calcium content.

Next, dry blended salt and certain stabilizers are added to the blend tank. In one embodiment, the stabilizers are locust bean gum, guar gum, and carrageenan. Next, flavors specific to the final type of dairy beverage are added to the blend tank. For example, if the final product is chocolate flavored, then cocoa is added. Other flavors include, for example, natural flavor, vanilla, strawberry, coffee, tea, and others. Examples of the specific flavors are set forth in greater detail in the examples listed below. In certain embodiments, it is generally preferable to add water soluble components such as flavors prior to adding fat components such as cream and mono and diglycerides, in order to promote blending of the components.

Next, sweeteners are added to the blend tank. In one embodiment, the sweeteners comprise sucralose and acesulfame potassium. These two sweeteners have been found to work well in combination with each other. Other known sweeteners may also be used. Next, emulsifiers may be added to the blend tank. In one embodiment, the emulsifiers comprise mono and diglycerides. Next, vitamins are added to the blend tank. In one embodiment, the vitamins comprise Vitamin A Palmitate and D3. In other embodiments, the vitamin is only Vitamin D3.

After the vitamins are added, the next step is to add skim milk (regular or ultrafiltered) and cream. In certain embodiments, regular skim milk is added prior to the batch tank prior to the cream being added to the batch tank. In other embodiments, cream is added to the batch tank prior to the ultrafiltered skim milk being added to the batch tank. In either scenario, it is preferable that the skim milk (regular or ultrafiltered) is added to the batch tank instead of the blend tank in order to prevent foaming of the skim milk (which may occur if the skim milk is added directly to the blend tank due to the high speed mixer in the blend tank). The skim milk (whether regular or ultrafiltered) is preferably added at this late stage in the order of adding ingredients to prevent foaming. Likewise, it is also desirable to add the cream at the later stage in the order of adding ingredients to minimize the shear on the fat membranes in the cream.

In an embodiment where cream is added before the ultrafiltered skim milk, cream is added to the batch tank after the vitamins are added to the blend tank. Preferably, the cream has already been measured for total fat and total solids values. Using a spreadsheet or appropriate calculation tool, the amount of cream that is needed to obtain a specific fat value in the final dairy beverage is calculated. For example, if it is desired that the final dairy beverage have approximately 4 grams of fat per 8 ounce serving, various formulas are utilized to calculate the total amount of cream that is needed in order to obtain that target value of fat in the finished product. This is referred to as the "standardization" of the dairy beverage to the target fat content.

The next step, after the addition of the cream, is to add the ultrafiltered skim milk to the batch tank. As previously discussed, the various characteristics of the ultrafiltered skim milk had previously been measured, and the amount of UF skim milk to be added was already calculated. In one example, the amount of ultrafiltered skim milk is calculated in order to obtain the target value of protein and calcium in the finished product.

In another embodiment, regular (or UF) skim milk is added to the batch tank after the step of adding the vitamins to the blend tank, but before the step of adding the cream to the batch tank. In an embodiment using regular skim milk, the contents of the regular skim milk may be sufficiently uniform enough that it may be unnecessary to perform the standardization calculations discussed above for the method using ultrafiltered skim milk.

After the above ingredients have been added to the tanks, the liquid product may be measured for content of solids, protein, fat, and calcium. In a typical embodiment, a certain quantity of the held back water (from the earlier described step of adding water to the batch tank) is added to the mixture, typically into the batch tank, in order to lower the total solids value to the desired target level. For example, in the example of a reduced fat dairy beverage in which a final total solids value such as 8.6 is desired, water may be added in order to lower the total solids value to 8.6. The addition of water may also affect other characteristics such as protein, fat, and calcium. Other ingredients may also need to be added in order to obtain the desired target value of various characteristics. For example, it may be desirable to add cream in order to raise the fat content to the desired target value, or add tricalcium phosphate to increase the calcium content to the desired target value, or add calcium caseinate to increase the protein content to the desired target value.

Throughout the above adding steps, it is desirable for the ingredients to be recirculated between the batch tank and blend tank, in order to prevent sedimentation of the ingredients and promote thorough mixing. One example of a suitable recirculation system has been described above, and is generally shown in FIG. 1.

After a liquid product with the desired characteristics and content has been obtained, various thermal processes may be performed on the liquid product. First, the liquid may be preheated. In one example, the liquid is preheated to between about 160 to 190 degrees F. The liquid may be preheated in any suitable device, such as a plate heat exchanger. Next, the liquid may be ultrapasteurized. In one embodiment, the liquid is ultrapasteurized by heating the liquid to between about 280 to 295 degrees F. for approximately 2 to 12 seconds. In a more specific embodiment, the liquid is heated to approximately 289 degrees F. for about 4 seconds using a direct steam injection system or steam infusion system. Any other suitable ultrapasteurization process may also be used with the present invention. Ultrapasteurization serves to sterilize the milk product without significantly changing its chemical composition. The use of ultrapasteurization increases the amount of bacterial destruction, thereby increasing the shelf life of the final dairy beverage compared to regular pasteurization. In other alternative embodiments, the liquid may be pasteurized instead of ultrapasteurized, however the shelf life of the dairy beverage will be reduced.

In one exemplary embodiment, after the ultrapasteurization, the liquid mixture is then cooled. In a more specific embodiment, the liquid mixture is cooled to between about 150 to 180 degrees F. In certain embodiments, the cooling step is performed in a vacuum chamber to promote the removal of any undesirable odors from the product.

Next, the liquid may be homogenized. Homogenization is the process of breaking up the fat globules and other solids to a sufficient size so that they remain suspended in the liquid, rather than separating out and floating to the surface. In one embodiment, the liquid is passed through two pressure stages of approximately 1500 to 2000 and 500 psi, respectively, in order to homogenize the liquid. Any other suitable homogenization process may also be used with the present invention. The homogenized liquid then may be cooled to a suitable temperature. The level of cooling depends on whether the final dairy product is intended for storage at refrigerated temperatures, or alternatively, at ambient temperatures.

In a dairy beverage designed for storage at refrigerated temperatures, the liquid is cooled after the homogenization step to below about 45 degrees F. In contrast, in a dairy beverage designed for storage at ambient temperatures, the liquid is cooled after the homogenization step to below about 70 degrees F.

The liquid is now ready to be placed in fill containers. The type of fill container and method for filling depends on a number of factors, including whether the final dairy product is intended for storage at refrigerated temperatures, or alternatively, at ambient temperatures. We will first describe examples of suitable fill containers for a refrigerated dairy product. Fill containers for a refrigerated dairy beverage may be of any size and shape suitable for use by a consumer. The size of the container can vary from multiserve containers in a variety of sizes such as gallon, half gallon, quart, pint, etc., to single serve containers, typically in a 12 ounce size. In a more specific embodiment, the fill container is a 64 ounce multiserve barrier board gabletop package with a twist spout. In another specific embodiment, the fill container is a 12 ounce single serve PET pigmented package with a sleeve.

Any other type of suitable fill container may also be used. The use of ultrapasteurization in the above described method, as well as the use of a proper fill container, allows the dairy beverage to have an extended shelf life. In one embodiment, the dairy beverage made by the method of the present invention has a refrigerated shelf life of approximately 30 to 90 days, with acceptable visual, textural, organoleptically, and nutritional characteristics. In a more specific embodiment, the dairy beverage has a refrigerated shelf life of approximately 60 days.

The type of fill containers suitable for an ambient dairy beverage may include any of the above described fill containers suitable for a refrigerated product, however it may be desirable to use a special type of fill container or filling equipment because dairy beverages typically have very short shelf lives when stored at ambient temperatures. It therefore may be useful to use a more sterilized process and fill container in order to prevent bacterial growth and spoilage in the ambient product. One example of suitable packaging for the ambient product is aseptic packaging. The use of ultrapasteurization in combination with a more sterilized filling process and aseptic fill containers allows the ambient dairy beverage to have an extended shelf life. In one embodiment, the dairy beverage made by the method of the present invention has a ambient shelf life of approximately 90 to 270 days, with acceptable visual, textural, organoleptically, and nutritional characteristics. In a more specific embodiment, the dairy beverage has an ambient shelf life of approximately 180 days.

The above describes several examples of suitable methods for making a low-carbohydrate dairy beverage according to the present invention. Many variations to the above methods are suitable. For example, the order of the steps of adding the calcium caseinate, whey protein isolate, buttermilk, disodium phosphate, tricalcium phosphate, dry blended salt and stabilizers, flavors, emulsifiers, vitamins, and cream can be significantly varied, but with varying results. In addition, various ingredients can be omitted altogether, however, with a possible change of characteristics. Varying the order or presence of steps and ingredients may affect some of the characteristics of the dairy beverage such as taste, aroma, texture, and/or stability. Likewise, the thermal processing steps and equipment may also be varied. For example, the heating steps may be performed at temperatures significantly different than described above.

In accordance with certain aspects of the present invention, the method of a making a dairy beverage may result in a dairy beverage that is low in carbohydrates. In certain embodiments, the method of making a dairy beverage will result in a dairy beverage having less than 5 grams of carbohydrates per 8 ounce serving. In a more specific embodiment, the carbohydrate content of the dairy beverage will be approximately 2 to 4 grams per 8 ounce serving. In an even more specific embodiment, the carbohydrate content will be approximately 3 grams per 8 ounce serving. Throughout the description, the amount of carbohydrates in the various ingredients and the final dairy product is discussed in terms of total carbohydrates. Carbohydrates can also be measured in terms of net carbohydrates (or effective net carbohydrates). The value for net carbohydrates is the amount of carbohydrates in a food with the low glycemic index carbohydrates (from dietary fiber, glycerine, and sugar alcohol) subtracted out from the total carbohydrate value. The value for net carbohydrates will be less than the value for total carbohydrates.

In accordance with various aspects of the present invention, the method of making a dairy beverage may result in a dairy beverage that is high in protein. As described in the method above, one or more ingredients may be added to obtain a desired protein level in the resulting dairy beverage. In certain embodiments described above, the primary ingredients for adding protein are calcium caseinate and/or whey protein. In certain embodiments, the method of making a dairy beverage will result in a dairy beverage having over 6 grams of protein per 8 ounce serving. In a more specific embodiment, the protein content of the dairy beverage will be approximately 8 to 20 grams per 8 ounce serving. In an even more specific embodiment, the protein content will be approximately 12 grams per 8 ounce serving (or 16 grams per 12 ounce serving).

In accordance with other various aspects of the present invention, the method of making a dairy beverage may result in a dairy beverage that is high in calcium. As described in the method above, one or more ingredients may be added in order to obtain a desired calcium level in the resulting dairy beverage. In certain embodiments described above, the primary ingredients for adding calcium are skim milk (UF or regular), tricalcium phosphate, cream, calcium caseinate, whey protein isolate, and buttermilk. In certain embodiments, the method of making a dairy beverage will result in a dairy beverage having over 300 mg of calcium per 8 ounce serving. In a more specific embodiment, the calcium content of the dairy beverage will be approximately 300 to 400 mg per 8 ounce serving. In an even more specific embodiment, the calcium content will be approximately 350 mg per 8 ounce serving (or 500 mg per 12 ounce serving).

In at least one embodiment of the invention, the above method provides for a low-carbohydrate, high protein, high calcium and low calorie dairy beverage. In certain embodiments, the dairy beverage has the following characteristics: 1 to 2% carbohydrates; 5 to 10% protein; 140 to 160 mg calcium per 100 grams; 20 to 60 kilocalories per 100 grams. Moreover, in at least one embodiment the dairy beverage has the following characteristics: 1 to 2% lactose; 5 to 15% solids; 5.0 to 6.4% milk solids nonfat; and a pH of between 6 to 8. It should be understood that the characteristics may vary depending on the type and amount of ingredients that are used to make the dairy beverage.

It may also be desirable that the dairy beverage resulting from the above method have an extended shelf life. The use of ultrapasteurization in the above described method allows the dairy beverage to have an extended shelf life. In some embodiments, it may also be acceptable to use regular pasteurization processes, but the dairy beverage may have a shorter shelf life. In one embodiment, the dairy beverage made by the method of the present invention has a refrigerated shelf life of approximately 30 to 90 days, with acceptable visual, textural, organoleptically, and nutritional characteristics. In a more specific embodiment, the dairy beverage has a refrigerated shelf life of approximately 60 days. In another embodiment, the dairy beverage made by the method of the present invention has an ambient shelf life of at approximately 90 to 270 days, with acceptable visual, textural, organoleptically, and nutritional characteristics. In a more specific embodiment, the dairy beverage has an ambient shelf life of approximately 180 days.

Examples of low-carbohydrate beverages that may be produced by certain embodiments of the disclosed methods are the varieties of Carb Countdown™ Dairy Beverages produced by HP Hood Inc. of Chelsea, Mass. These varieties include a fat free dairy beverage, a reduced fat (such as 2% fat) dairy beverage, a whole, or full fat, dairy beverage, and a chocolate flavored dairy beverage (regular or reduced fat). Other examples of possible varieties, such as a mocha flavored dairy beverage, a vanilla flavored dairy beverage, a coffee flavored dairy beverage (such as cappuccino), a chai tea flavored dairy beverage, and a strawberry flavored dairy beverage, are also contemplated by the methods of the present invention.

Typical formulations for exemplary low-carbohydrate dairy beverages according to the present invention are described below:

EXAMPLE 1

Reduced Fat Dairy Beverage

One exemplary product is a reduced fat dairy beverage. The ingredients and percentages of one example are as follows:

| Ingredient | % |
|---|---|
| Water | 75.5723 |
| Ultrafiltered Skim Milk | 16.5000 |
| Cream | 3.8750 |
| Instant Calcium Caseinate | 2.7451 |
| Instant Whey Protein Isolate | 0.650 |
| Tricalcium Phosphate | 0.1800 |
| Stabilizer Blend | 0.1100 |
| Sweet Cream Buttermilk | 0.1000 |
| Disodium Phosphate | 0.1000 |
| Salt | 0.1000 |
| Emulsifier | 0.0500 |
| Carrageenan | 0.0100 |
| Sucralose Liquid Concentrate | 0.0028 |
| Acesulfame Potassium | 0.0028 |
| Masking Flavor | 0.0010 |
| Vitamin A/D3 (.04 ml/gal) | 0.0010 |

Based on the specific ingredients and percentages above, certain characteristics of the final dairy beverage can be calculated, such as the percentages of protein, total solids, fat, carbohydrates, calcium, milk solids nonfat, and density, as well as total costs. For example, in example 1 above, the percentage of protein is about 5.0%, the percentage of total solids is about 8.6%, the percentage of fat is about 1.6%, and the percentage of carbohydrates is about 1.2%. The finished product values, per 8 ounce serving, of the product of example 1 are as follows: 12.12 grams of protein; 3.97 grams of fat; 2.96 grams of carbohydrates; and 372 milligrams of calcium.

EXAMPLE 2

Full Fat Dairy Beverage

Another exemplary product is a full fat dairy beverage. The ingredients and percentages of one example are as follows:

| Ingredient | % |
|---|---|
| Water | 69.9938 |
| Skim Milk | 17.0000 |
| Cream | 7.5500 |
| Instant Calcium Caseinate | 4.0000 |
| Instant Whey Protein Isolate | 0.8000 |
| Tricalcium Phosphate | 0.2200 |
| Stabilizer Blend | 0.1200 |
| Disodium Phosphate | 0.1000 |
| Salt | 0.1000 |
| Sweet Cream Buttermilk | 0.0500 |
| Emulsifier | 0.0500 |
| Carrageenan | 0.0100 |
| Sucralose Liquid Concentrate | 0.0025 |
| Acesulfame Potassium | 0.0025 |
| Masking Flavor | 0.0010 |
| Vitamin D3 (.008 ml/gal) | 0.0002 |

Based on the specific ingredients and percentages above, certain characteristics of the final dairy beverage can be calculated, such as the percentages of protein, total solids, fat, carbohydrates, calcium, milk solids nonfat, and density, as well as total costs. For example, in example 2 above, the percentage of protein is about 5.0%, the percentage of total solids is about 10.1%, the percentage of fat is about 3.1%, and the percentage of carbohydrates is about 1.2%. The finished product values, per 8 ounce serving, of the product of example 2 are as follows: 12.04 grams of protein; 7.52 grams of fat; 2.99 grams of carbohydrates; and 375 milligrams of calcium.

EXAMPLE 3

Fat Free Dairy Beverage

Another exemplary product is a fat free dairy beverage. The ingredients and percentages of one example are as follows:

| Ingredient | % |
|---|---|
| Water | 78.7683 |
| Ultrafiltered Skim Milk | 17.000 |
| Instant Calcium Caseinate | 3.3473 |
| Sweet Cream Buttermilk | 0.1600 |
| Tricalcium Phosphate | 0.1600 |
| Cream | 0.1500 |
| Stabilizer Blend | 0.1400 |
| Disodium Phosphate | 0.1000 |
| Salt | 0.1000 |
| Emulsifier | 0.0500 |
| Carrageenan | 0.0100 |
| Masking Flavor | 0.0080 |
| Sucralose Liquid Concentrate | 0.0027 |
| Acesulfame Potassium | 0.0027 |
| Vitamin A/D3 (.04 ml/gal) | 0.0010 |

Based on the specific ingredients and percentages above, certain characteristics of the final dairy beverage can be calculated, such as the percentages of protein, total solids, fat, carbohydrates, calcium, milk solids nonfat, and density, as well as total costs. For example, in example 3 above, the percentage of protein is about 5.0%, the percentage of total solids is about 7.1%, the percentage of fat is about 0.15%, and the percentage of carbohydrates is about 1.2%. The finished product values, per 8 ounce serving, of the product of example 3 are as follows: 12.05 grams of protein; 0.36 grams of fat; 2.88 grams of carbohydrates; and 371 milligrams of calcium.

EXAMPLE 4

Reduced Fat Chocolate Dairy Beverage

Another exemplary product is a reduced fat chocolate dairy beverage. The ingredients and percentages of one example are as follows:

| Ingredient | % |
| --- | --- |
| Water | 85.2678 |
| Skim Milk | 3.6000 |
| Cream | 3.4500 |
| Instant Calcium Caseinate | 3.3000 |
| Instant Whey Protein Isolate | 1.9000 |
| Cocoa | 1.5000 |
| Vanilla | 0.2500 |
| Tricalcium Phosphate | 0.2500 |
| Stabilizer Blend | 0.1300 |
| Salt | 0.1000 |
| Disodium Phosphate | 0.1000 |
| Sweet Cream Buttermilk | 0.0500 |
| Emulsifier | 0.0500 |
| Sucralose Liquid Concentrate | 0.0205 |
| Acesulfame Potassium | 0.0205 |
| Carrageenan | 0.0100 |
| Vitamin A/D3 (.046 ml/gal) | 0.0012 |

Based on the specific ingredients and percentages above, certain characteristics of the final dairy beverage can be calculated, such as the percentages of protein, total solids, fat, carbohydrates, calcium, milk solids nonfat, and density, as well as total costs. For example, in example 4 above, the percentage of protein is about 5.1%, the percentage of total solids is about 9.0%, the percentage of fat is about 1.6%, and the percentage of carbohydrates is about 1.3%. The finished product values, per 8 ounce serving, of the product of example 4 are as follows: 12.35 grams of protein; 3.89 grams of fat; 3.03 grams of carbohydrates; and 352 milligrams of calcium.

EXAMPLE 5

Mocha Dairy Beverage

Another exemplary product is a reduced fat mocha dairy beverage. The ingredients and percentages of one example are as follows:

| Ingredient | % |
| --- | --- |
| Water | 82.7440 |
| Skim Milk | 4.2000 |
| Cream | 4.2000 |
| Instant Calcium Caseinate | 4.2000 |
| Coffee Extract | 1.4000 |

-continued

| Ingredient | % |
| --- | --- |
| Cocoa | 1.3000 |
| Instant Whey Protein Isolate | 0.9000 |
| Vanilla | 0.5000 |
| Tricalcium Phosphate | 0.2350 |
| Stabilizer Blend | 0.1000 |
| Disodium Phosphate | 0.1000 |
| Emulsifier | 0.5000 |
| Sucralose Liquid Concentrate | 0.0300 |
| Acesulfame Potassium | 0.0300 |
| Carrageenan | 0.0100 |
| Vitamin A/D3 (.04 ml/gal) | 0.0010 |

Based on the specific ingredients and percentages above, certain characteristics of the final dairy beverage can be calculated, such as the percentages of protein, total solids, fat, carbohydrates, calcium, milk solids nonfat, and density, as well as total costs. For example, in example 5 above, the percentage of protein is about 5.0%, the percentage of total solids is about 9.6%, the percentage of fat is about 1.9%, and the percentage of carbohydrates is about 1.3%. The finished product values, per 12 ounce serving, of the product of example 5 are as follows: 18.29 grams of protein; 6.84 grams of fat; 4.85 grams of carbohydrates; and 534 milligrams of calcium.

EXAMPLE 6

Vanilla Dairy Beverage

Another exemplary product is a reduced fat vanilla dairy beverage. The ingredients and percentages of one example are as follows:

| Ingredient | % |
| --- | --- |
| Water | 82.2700 |
| Skim Milk | 6.0000 |
| Cream | 4.7500 |
| Instant Calcium Caseinate | 4.2000 |
| Instant Whey Protein Isolate | 1.0000 |
| Vanilla | 0.7000 |
| Tricalcium Phosphate | 0.2200 |
| Sweet Cream Buttermilk | 0.4000 |
| Stabilizer Blend | 0.1500 |
| Disodium Phosphate | 0.1000 |
| Salt | 0.1000 |
| Emulsifier | 0.0500 |
| Sucralose Liquid Concentrate | 0.0230 |
| Acesulfame Potassium | 0.0230 |
| Carrageenan | 0.0130 |
| Vitamin A/D3 (0.4 ml/gal) | 0.0010 |

Based on the specific ingredients and percentages above, certain characteristics of the final dairy beverage can be calculated, such as the percentages of protein, total solids, fat, carbohydrates, calcium, milk solids nonfat, and density, as well as total costs. For example, in example 6 above, the percentage of protein is about 5.1%, the percentage of total solids is about 8.9%, the percentage of fat is about 2.0%, and the percentage of carbohydrates is about 0.84%. The finished product values, per 12 ounce serving, of the product of example 6 are as follows: 18.38 grams of protein; 7.30 grams of fat; 3.05 grams of carbohydrates; and 539 milligrams of calcium.

EXAMPLE 7

Cappuccino Dairy Beverage

Another exemplary product is a reduced fat cappuccino dairy beverage. The ingredients and percentages of one example are as follows:

| Ingredient | % |
| --- | --- |
| Water | 74.9545 |
| Skim Milk | 14.0000 |
| Cream | 4.1000 |
| Instant Calcium Caseinate | 2.9000 |
| Instant Whey Protein Concentrate | 2.2000 |
| Coffee Extract | 1.2500 |
| Tricalcium Phosphate | 0.2100 |
| Stabilizer Blend | 0.1500 |
| Salt | 0.1000 |
| Disodium Phosphate | 0.1000 |
| Spice Ground Cinnamon | 0.0075 |
| Sucralose Liquid Concentrate | 0.0250 |
| Acesulfame Potassium | 0.0030 |

Based on the specific ingredients and percentages above, certain characteristics of the final dairy beverage can be calculated, such as the percentages of protein, total solids, fat, carbohydrates, calcium, milk solids nonfat, and density, as well as total costs. For example, in example 7 above, the percentage of protein is about 5.0%, the percentage of total solids is about 9.0%, the percentage of fat is about 1.8%, and the percentage of carbohydrates is about 1.2%. The finished product values, per 8 ounce serving, of the product of example 7 are as follows: 12.13 grams of protein; 4.43 grams of fat; 3.01 grams of carbohydrates; and 359 milligrams of calcium.

EXAMPLE 8

Low Fat Chocolate Dairy Beverage

Another exemplary product is a low fat 1% chocolate dairy beverage. The ingredients and percentages of one example are as follows:

| Ingredient | % |
| --- | --- |
| Water | 84.8460 |
| Skim Milk | 6.0000 |
| Instant Calcium Caseinate | 3.1000 |
| Instant Whey Protein Concentrate | 2.2000 |
| Cream | 4.4000 |
| Cocoa | 1.1500 |
| Vanilla | 0.2500 |
| Tricalcium Phosphate | 0.2300 |
| Stabilizer Blend | 0.1900 |
| Salt | 0.1000 |
| Disodium Phosphate | 0.1000 |
| Sucralose Liquid Concentrate | 0.0300 |
| Acesulfame Potassium | 0.0040 |

Based on the specific ingredients and percentages above, certain characteristics of the final dairy beverage can be calculated, such as the percentages of protein, total solids, fat, carbohydrates, calcium, milk solids nonfat, and density, as well as total costs. For example, in example 8 above, the percentage of protein is about 5.0%, the percentage of total solids is about 7.9%, the percentage of fat is about 1.0%, and the percentage of carbohydrates is about 1.2%. The finished product values, per 8 ounce serving, of the product of example 8 are as follows: 12.11 grams of protein; 2.43 grams of fat; 3.01 grams of carbohydrates; and 360 milligrams of calcium.

The above examples are for purposes of illustration only. As noted above, various methods for making dairy beverages, and resulting dairy beverages, may be contemplated by the present invention. The exemplary embodiments above, therefore, are not intended to limit the use of their modifications, variations, other known techniques, and techniques that skilled artisans learn from practicing the invention.

Further, although the exemplary embodiments described above have been discussed in the context of low-carbohydrate dairy beverages, the methods and combination of ingredients disclosed are not limited to that application. Rather, they can be employed for a variety of dairy beverages and products, including dairy beverages that are high in protein, low in fat, and/or high in calcium, or other characteristics.

It will be apparent to those skilled in the art that various modifications and variations can be made in the exemplary methods and dairy beverages described above. Other embodiments of the invention will be apparent to those skilled in the art from consideration of the specification and practice of the invention disclosed herein. It is intended that the specification and examples be considered as exemplary only.

What is claimed is:

1. A method of making a low-carbohydrate dairy beverage having less than 5 grams of carbohydrates per 8 ounce serving, the method comprising:
   selecting ingredients;
   adding the ingredients to a tank in the following order to obtain a product: water, disodium phosphate, tricalcium phosphate, salt and a stabilizer, a flavor, a sweetener, an emulsifier, a vitamin, skim milk;
   as each ingredient is added to the tank, mix the ingredients;
   ultrapasteurizing the product;
   homogenizing the product; and
   cooling the product.

2. The method of claim 1, further comprising adding cream to the tank before adding skim milk.

3. The method of claim 1, further comprising adding cream to the tank after adding skim milk.

4. The method of claim 1, wherein the skim milk is ultrafiltered skim milk.

5. The method of claim 1, further comprising weighing and measuring the ingredients prior to the adding step.

6. The method of claim 5, further comprising determining the percentage of total solids, protein, and fat in the ingredients prior to the adding step.

7. The method of claim 1, wherein the water has a temperature of between 40 to 100 degrees F.

8. The method of claim 1, wherein the tank comprises a batch tank and a blend tank.

9. The method of claim 1, wherein the stabilizer comprises one or more of the following: locust bean gum, guar gum, and carrageenan.

10. The method of claim 1, wherein the flavor includes one or more of the following: vanilla, cocoa, tea, strawberry, mocha, and cappuccino.

11. The method of claim 1, wherein the sweetener includes one or more of the following: sucralose and acesulfame potassium.

12. The method of claim 1, wherein the emulsifier includes mono and diglycerides.

13. The method of claim 1, wherein the vitamin includes one or more of the following: Vitamin A Palmitate and Vitamin D3.

14. The method of claim 1, wherein a specific amount of tricalcium phosphate is added to obtain a specific calcium content in the dairy beverage.

15. The method of claim 1, wherein a specific amount of skim milk is added to obtain a specific protein and calcium content in the dairy beverage.

16. The method of claim 1, wherein a specific amount of cream is added to obtain a specific fat content in the dairy beverage.

17. The method of claim 1, wherein mixing the ingredients includes recirculating the ingredients between a batch tank and a blend tank.

18. The method of claim 1, further comprising measuring the content of solids, protein, fat, and calcium in the product after the mixing step.

19. The method of claim 1, further comprising adding additional water to obtain a desired content of solids, protein, fat, and calcium in the dairy beverage.

20. The method of claim 1, wherein the ultrapasteurizing step includes heating the product to between about 280 to 295 degrees F. for approximately 2 to 12 seconds.

21. The method of claim 1, further comprising vacuum cooling the product to between about 150 to 180 degrees F. between the ultrapasteurizing and homogenizing steps.

22. The method of claim 1, wherein the homogenizing step includes homogenizing the product at two pressure stages of approximately 1500 to 2500 and 500 psi, respectively.

23. The method of claim 1, wherein the cooling step includes cooling the product to less than 45 degrees F.

24. The method of claim 1, wherein the cooling step includes cooling the product to less than 70 degrees F.

25. The method of claim 1, wherein the dairy beverage has a carbohydrate content of approximately 3 grams per 8 ounce serving.

26. The method of claim 1, wherein the dairy beverage has a protein content of at least 8 grams per 8 ounce serving.

27. The method of claim 26, wherein the dairy beverage has a protein content of approximately 12 grams per 8 ounce serving.

28. The method of claim 1, wherein the dairy beverage has a calcium content of at least 300 milligrams per 8 ounce serving.

29. The method of claim 28, wherein the dairy beverage has a calcium content of approximately 350 milligrams per 8 ounce serving.

30. The method of claim 1, wherein the dairy beverage has a refrigerated shelf life of at least 30 days and an ambient shelf life of at least 90 days.

31. The method of claim 30, wherein the dairy beverage has a refrigerated shelf live of approximately 60 days and an ambient shelf life of approximately 180 days.

32. A method of making a low-carbohydrate dairy beverage having less than 5 grams of carbohydrates per 8 ounce serving, the method comprising:
   selecting ingredients;
   mixing the ingredients together in the following order to obtain an intermediate product: water, disodium phosphate, tricalcium phosphate, salt and a stabilizer, a flavor, a sweetener, an emulsifier, a vitamin;
   then mix skim milk and cream in any order to the intermediate product to obtain a final product;
   ultrapasteurizing the final product;
   homogenizing the final product; and
   cooling the final product.

33. The method of claim 32, wherein cream is added to the intermediate product before adding skim milk.

34. The method of claim 33, wherein the skim milk is ultrafiltered skim milk.

35. The method of claim 32, wherein cream is added to the intermediate product after adding skim milk.

36. The method of claim 32, wherein the sweetener includes a combination of sucralose and acesulfame potassium.

37. The method of claim 32, further comprising vacuum cooling the product to between about 150 to 180 degrees F. between the ultrapasteurizing and homogenizing steps.

38. A method of making a low-carbohydrate dairy beverage having less than 5 grams of carbohydrates per 8 ounce serving, the method comprising:
   selecting, weighing, and measuring ingredients;
   testing the ingredients for the percentage of total solids, protein, and fat;
   adding water to a batch tank, the water having a temperature of between 40 to 100 degrees F.;
   adding a specific amount of calcium caseinate to a blend tank in order to obtain a specific protein content in the dairy beverage;
   adding buttermilk to the blend tank;
   adding disodium phosphate to the blend tank;
   adding a specific amount of tricalcium phosphate to the blend tank in order to obtain a specific calcium content in the dairy beverage;
   adding salt and stabilizers to the blend tank, the stabilizers comprising locust bean gum, guar gum, and carrageenan;
   adding a flavor to the blend tank;
   adding sweeteners to the blend tank, the sweeteners comprising sucralose and acesulfame potassium;
   adding emulsifiers to the blend tank, the emulsifiers comprising mono and diglycerides;
   adding vitamins to the blend tank, the vitamins comprising one or more of Vitamin A Palmitate and D3;
   adding a specific amount of skim milk to the batch tank in order to obtain a specific protein and calcium content in the dairy beverage;
   adding a specific amount of cream to the batch tank in order to obtain a specific fat content in the dairy beverage;
   mixing the ingredients throughout the above adding steps by recirculating the ingredients between the batch tank and the blend tank;
   measuring the content of solids, protein, fat, and calcium;
   adding additional water to obtain a product with a desired content of solids, protein, fat, and calcium;
   heating the product to between 160 and 190 degrees F.;
   ultrapasteurizing the product to between 280 to 295 degrees F. for approximately 2 to 12 seconds on a direct steam injection system or steam infusion system;
   cooling the product in a vacuum chamber to between 150 to 180 degrees F.;
   homogenizing the product at two pressure stages of approximately 1500 to 2500 and 500 psi, respectively; and
   cooling the dairy beverage.

39. The method of claim 38, wherein the cooling step includes cooling the product to less than 45 degrees F.

40. The method of claim 38, wherein the cooling step includes cooling the product to less than 70 degrees F.

41. A method of making a low-carbohydrate dairy beverage product having less than 5 grams of carbohydrates per 8 ounce serving, comprising:
- adding water to a tank;
- adding calcium caseinate to the tank;
- adding skim milk to the tank;
- mixing the contents of the tank to obtain a product;
- heating the product to at least 150 degrees F.;
- ultrapasteurizing the product;
- cooling the product;
- homogenizing the product; and
- cooling the product.

42. The method of claim 41, wherein the tank includes a first tank in fluid communication with a second tank.

43. The method of claim 41, further comprising, between the steps of adding calcium caseinate and adding skim milk, the step of adding whey protein isolate to the tank.

44. The method of claim 43, further comprising, after the step of adding the calcium caseinate and whey protein isolate in the tank, adding buttermilk, tricalcium phosphate, salt, a stabilizer, a flavor, a sweetener, an emulsifier, a vitamin, and cream to the tank.

45. The method of claim 41, further comprising, between the steps of adding calcium caseinate and adding skim milk, the step of adding whey protein concentrate to the tank.

46. The method of claim 1, further comprising adding calcium caseinate and buttermilk to the tank after adding water and before adding disodium phosphate.

47. The method of claim 32, further comprising adding calcium caseinate and buttermilk to the tank after adding water and before adding disodium phosphate.

48. The method of claim 46, further comprising adding whey protein isolate to the tank after adding calcium caseinate.

49. The method of claim 46, further comprising adding whey protein concentrate to the tank after adding calcium caseinate.

50. The method of claim 46, wherein a specific amount of calcium caseinate is added to obtain a specific protein content in the dairy beverage.

51. The method of claim 47, further comprising adding whey protein isolate to the tank after adding calcium caseinate and before adding buttermilk.

52. The method of claim 47, further comprising adding whey protein concentrate to the tank after adding calcium caseinate and before adding buttermilk.

* * * * *